US008576950B2

(12) United States Patent
Hasegawa et al.

(10) Patent No.: US 8,576,950 B2
(45) Date of Patent: Nov. 5, 2013

(54) RECEPTION APPARATUS, RECEPTION METHOD, DEMODULATION APPARATUS, DEMODULATION METHOD, AND PROGRAM

(75) Inventors: Ryo Hasegawa, Tokyo (JP); Hirofumi Maruyama, Tokyo (JP); Katsumi Takaoka, Chiba (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 13/235,885

(22) Filed: Sep. 19, 2011

(65) Prior Publication Data

US 2012/0106660 A1 May 3, 2012

(30) Foreign Application Priority Data

Oct. 27, 2010 (JP) ................................. 2010-240782

(51) Int. Cl.
| H03K 9/00 | (2006.01) |
| H04L 27/06 | (2006.01) |
| H04L 27/14 | (2006.01) |
| H04L 27/22 | (2006.01) |

(52) U.S. Cl.
USPC ........... 375/316; 375/259; 375/260; 375/261; 375/324; 375/340; 370/211; 370/464; 370/335

(58) Field of Classification Search
USPC ................ 375/316, 259, 260, 261, 324, 340; 370/211, 464, 335
See application file for complete search history.

(56) References Cited

U.S. PATENT DOCUMENTS

| 2007/0253442 A1* | 11/2007 | Yu et al. ......................... 370/464 |
| 2007/0263529 A1* | 11/2007 | Ishikura et al. ................ 370/211 |
| 2010/0027695 A1* | 2/2010 | Yan et al. ....................... 375/260 |
| 2010/0157957 A1* | 6/2010 | Yang et al. ..................... 370/336 |
| 2010/0185920 A1* | 7/2010 | Song et al. ..................... 714/758 |
| 2011/0299593 A1* | 12/2011 | Pettersson et al. ........ 375/240.03 |

FOREIGN PATENT DOCUMENTS

| JP | 2002-101352 | 4/2002 |
| JP | 2004-222050 | 8/2004 |

OTHER PUBLICATIONS

U.S. Appl. No. 13/235,806, filed Sep. 19, 2011, Hasefawa, et al.
U.S. Appl. No. 13/235,854, filed Sep. 19, 2011, Maruyama, et al.
U.S. Appl. No. 13/370,837, filed Feb. 10, 2012, Hasegawa, et al.

* cited by examiner

*Primary Examiner* — Phuong Phu
(74) *Attorney, Agent, or Firm* — Oblon, Spivak, McClelland, Maier & Neustadt, L.L.P.

(57) ABSTRACT

Disclosed herein is a reception apparatus including: a reception section configured to receive a signal modulated by a predetermined system defined by a predetermined standard; a decoding section configured to decode transmission parameters included in the received signal; an acquisition section configured to acquire from among sequentially decoded transmission parameters the parameters used in a demodulation process performed on the received signal; and a control section configured such that if the acquired transmission parameters used in the demodulation process on the received signal are different from the sequentially decoded transmission parameters, then the control section controls the demodulation process on the received signal based on newly decoded transmission parameters.

16 Claims, 7 Drawing Sheets

RECEPTION APPARATUS, RECEPTION METHOD, DEMODULATION APPARATUS, DEMODULATION METHOD, AND PROGRAM

BACKGROUND

The present disclosure relates to a reception apparatus, a reception method, a demodulation apparatus, a demodulation method, and a program. More particularly, the disclosure relates to a reception apparatus, a reception method, a demodulation apparatus, a demodulation method, and a program for reliably performing a demodulation process.

In the past, digital broadcast reception apparatuses had receivable channels searched for and stored inside when the apparatuses were used for the first time. Based on the result of the channel search, the reception apparatuses then allowed channels to be selected (e.g., see Japanese Patent Laid-open Nos. 2002-101352 and 2004-222050).

During the channel search, the presence or absence of a broadcast at each modulation frequency is determined. If it is determined that a broadcast is present at a given frequency, transmission parameters of the channel corresponding to the frequency are decoded. The decoded transmission parameters are stored in a memory in conjunction with the modulation frequency. When this process has been performed on all modulation frequencies subject to search, the initial channel search is completed. At ordinary channel change time following the initial channel search, the transmission parameters stored in the memory are referenced and a desired digital broadcast is demodulated.

For example, the DTMB (Digital Terrestrial Multimedia Broadcast) standard is a typical terrestrial digital broadcasting system, among others.

Figure 1:
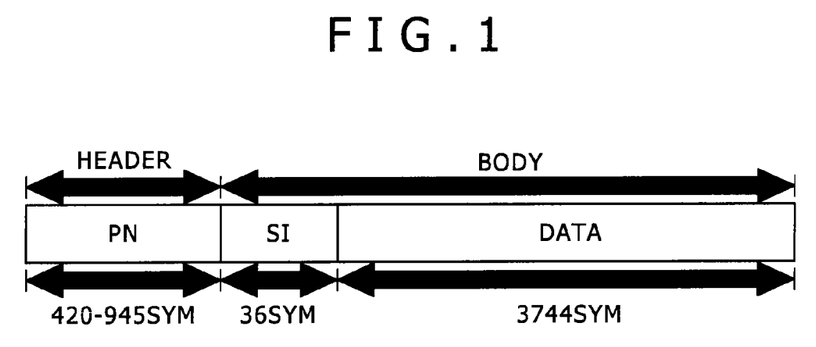
FIG. 1 is a schematic view showing the frame format of the DTMB standard.

FIG. 1 shows the frame format of the DTMB standard.

A frame according to the DTMB standard is made up of a header and a body. A symbol sequence of PN (pseudo noise) is inserted into the header. The body includes system information symbols (SI in FIG. 1) and data symbols ("Data" in FIG. 1), in that order. A symbol sequence obtained by encoding the transmission parameters as per predetermined rules is inserted into the 36-symbol system information at the beginning of the body.

As the transmission parameters, the DTMB standard stipulates FEC (Forward Error Correction) rates (e.g., 0.4, 0.6, 0.8), interleave lengths (e.g., 240, 720), or constellations (e.g., 4 QAM, 4 QAM-NR, 16 QAM, 32 QAM, 64 QAM), for example.

SUMMARY

With regard to the terrestrial digital broadcasting system, there exist standards that can possibly let the transmission parameters included in the transmitted signal be changed. In the past, however, the possibility of the transmission parameters being changed in the transmitted signal was not considered. Thus if the transmission parameters were changed in that manner, the demodulation process would fail.

When the demodulation process failed, it was difficult to continue viewing the corresponding channel. The viewer was then obliged to perform another channel search, which could be a burden on the viewer.

The present disclosure has been made in view of the above circumstances and provides a reception apparatus, a reception method, a demodulation apparatus, a demodulation method, and a program for reliably performing the demodulation process so as to alleviate operating burdens on the viewer.

According to one embodiment of the present disclosure, there is provided a reception apparatus including: a reception section configured to receive a signal modulated by a predetermined system defined by a predetermined standard; a decoding section configured to decode transmission parameters included in the received signal; an acquisition section configured to acquire from among sequentially decoded transmission parameters the parameters used in a demodulation process performed on the received signal; and a control section configured such that if the acquired transmission parameters used in the demodulation process on the received signal are different from the sequentially decoded transmission parameters, then the control section controls the demodulation process on the received signal based on newly decoded transmission parameters.

Preferably, if the difference exists between the transmission parameters, the control section may initialize components for executing steps related to the demodulation process on the received signal, before causing the components to again execute the demodulation process based on the newly decoded transmission parameters resulting from a new search.

Preferably, if the difference in time between the acquired transmission parameters used in the demodulation process on the received signal on the one hand and the sequentially decoded transmission parameters on the other hand exceeds a predetermined time period, then the control section may start initializing the components for executing the demodulation process on the received signal.

Preferably, if the difference exists between the transmission parameters, the control section may replace the transmission parameters used in the demodulation process on the received signal with the newly decoded transmission parameters different from the currently used transmission parameters.

Preferably, if the difference in time between the acquired transmission parameters used in the demodulation process on the received signal on the one hand and the sequentially decoded transmission parameters on the other hand exceeds a predetermined time period, then the control section may change the currently used transmission parameters.

Preferably, the transmission parameters may constitute information about forward error correction rates known as FEC rates, interleave lengths, or constellations.

According to another embodiment of the present disclosure, there is provided a reception method for use with a reception apparatus, the reception method including: causing the reception apparatus to receive a signal modulated by a predetermined system defined by a predetermined standard; causing the reception apparatus to decode transmission parameters included in the received signal; causing the reception apparatus to acquire from among sequentially decoded transmission parameters the parameters used in a demodulation process performed on the received signal; and if the acquired transmission parameters used in the demodulation process on the received signal are different from the sequentially decoded transmission parameters, then causing the reception apparatus to control the demodulation process on the received signal based on newly decoded transmission parameters.

According to a further embodiment of the present disclosure, there is provided a program for use with a computer, the program including: causing the computer to function as a reception section receiving a signal modulated by a predetermined system defined by a predetermined standard; causing the computer to function as a decoding section decoding transmission parameters included in the received signal;

causing the computer to function as an acquisition section acquiring from among sequentially decoded transmission parameters the parameters used in a demodulation process performed on the received signal; and if the acquired transmission parameters used in the demodulation process on the received signal are different from the sequentially decoded transmission parameters, then causing the computer to function as a control section controlling the demodulation process on the received signal based on newly decoded transmission parameters.

Where the above-outlined reception apparatus, reception method, or program of the embodiments of the present disclosure is in use, a signal modulated by a predetermined system defined by a predetermined standard is first received. Transmission parameters included in the received signal are decoded. From among sequentially decoded transmission parameters, the parameters used in a demodulation process performed on the received signal are acquired. If the acquired transmission parameters used in the demodulation process on the received signal are different from the sequentially decoded transmission parameters, the demodulation process on the received signal is controlled based on newly decoded transmission parameters.

According to an even further embodiment of the present disclosure, there is provided a demodulation apparatus including: a decoding section configured to decode transmission parameters included in a received signal modulated by a predetermined system defined by a predetermined standard; an acquisition section configured to acquire from among sequentially decoded transmission parameters the parameters used in a demodulation process performed on the received signal; and a control section configured such that if the acquired transmission parameters used in the demodulation process on the received signal are different from the sequentially decoded transmission parameters, then the control section controls the demodulation process on the received signal based on newly decoded transmission parameters.

Preferably, if the difference exists between the transmission parameters, the control section may initialize components for executing steps related to the demodulation process on the received signal, before causing the components to again execute the demodulation process based on the newly decoded transmission parameters resulting from a new search.

Preferably, if the difference in time between the acquired transmission parameters used in the demodulation process on the received signal on the one hand and the sequentially decoded transmission parameters on the other hand exceeds a predetermined time period, then the control section may start initializing the components for executing the demodulation process on the received signal.

Preferably, if the difference exists between the transmission parameters, the control section may replace the transmission parameters used in the demodulation process on the received signal with the newly decoded transmission parameters different from the currently used transmission parameters.

Preferably, if the difference in time between the acquired transmission parameters used in the demodulation process on the received signal on the one hand and the sequentially decoded transmission parameters on the other hand exceeds a predetermined time period, then the control section may change the currently used transmission parameters.

Preferably, the transmission parameters may constitute information about forward error correction rates known as FEC rates, interleave lengths, or constellations.

According to a still further embodiment of the present disclosure, there is provided a demodulation method for use with a demodulation apparatus, the demodulation method including: causing the demodulation apparatus to decode transmission parameters included in a received signal modulated by a predetermined system defined by a predetermined standard; causing the demodulation apparatus to acquire from among sequentially decoded transmission parameters the parameters used in a demodulation process performed on the received signal; and if the acquired transmission parameters used in the demodulation process on the received signal are different from the sequentially decoded transmission parameters, then causing the demodulation apparatus to control the demodulation process on the received signal based on newly decoded transmission parameters.

According to a yet further embodiment of the present disclosure, there is provided a program for use with a computer, the program including: causing the computer to function as a decoding section decoding transmission parameters included in a received signal modulated by a predetermined system defined by a predetermined standard; causing the computer to function as an acquisition section acquiring from among sequentially decoded transmission parameters the parameters used in a demodulation process performed on the received signal; and if the acquired transmission parameters used in the demodulation process on the received signal are different from the sequentially decoded transmission parameters, then causing the computer to function as a control section controlling the demodulation process on the received signal based on newly decoded transmission parameters.

Where the above-outlined demodulation apparatus, demodulation method, or program of the embodiments of the present disclosure is in use, transmission parameters included in a received signal modulated by a predetermined system defined by a predetermined standard are first decoded. From among sequentially decoded transmission parameters, the parameters used in a demodulation process performed on the received signal are acquired. If the acquired transmission parameters used in the demodulation process on the received signal are different from the sequentially decoded transmission parameters, then the demodulation process on the received signal is controlled based on newly decoded transmission parameters.

According to the present disclosure outlined above, operating burdens on the viewer can be alleviated.

DETAILED DESCRIPTION OF THE PREFERRED EMBODIMENTS

Some preferred embodiments of the present disclosure (simply called the embodiment or embodiments) will now be described. The description will be given under the following headings:
1. First embodiment;
2. Second embodiment; and
3. Variations.

<1. First Embodiment>
[Structure of the Reception Apparatus]

Figure 2:
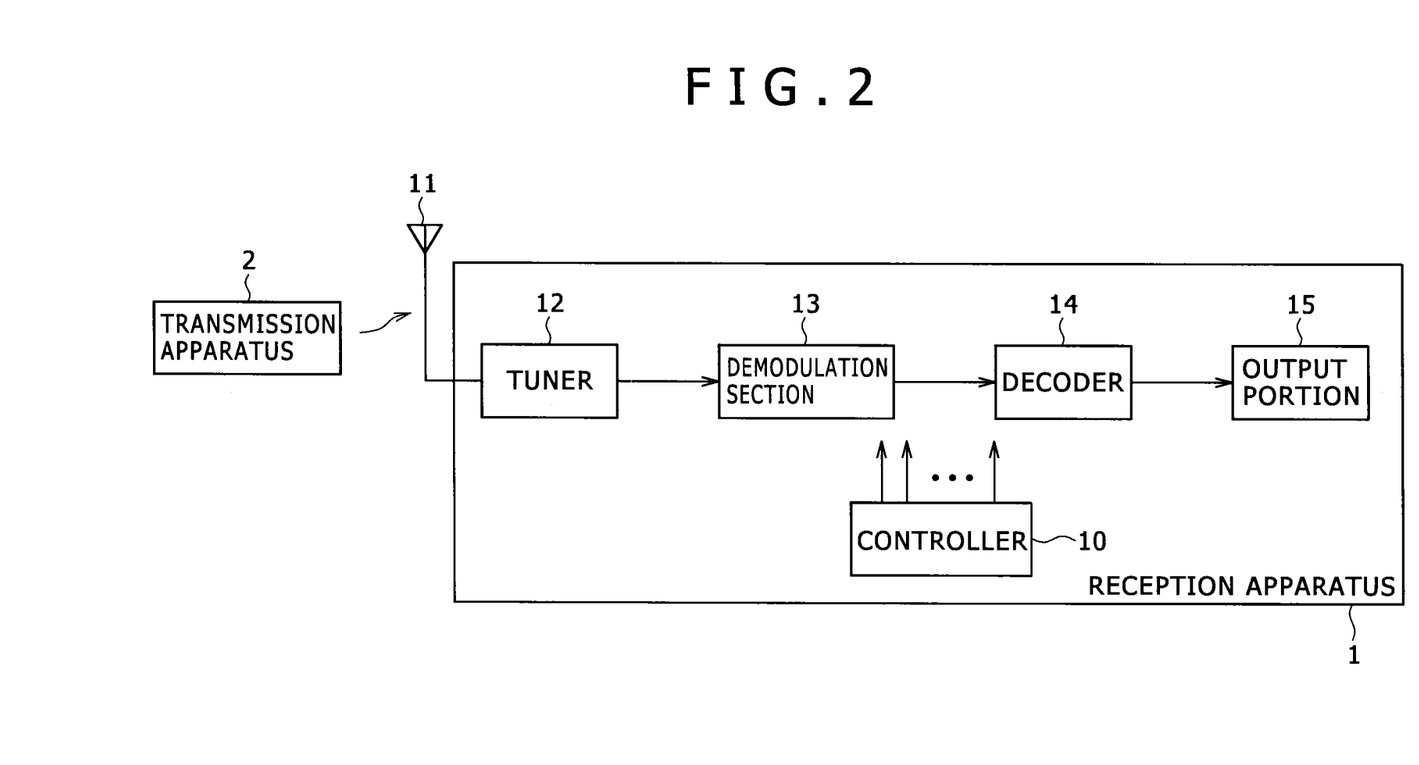
FIG. 2 is a block diagram showing a structure of a reception apparatus to which the embodiments of the present disclosure are applied.

FIG. 2 is a block diagram showing a structure of a reception apparatus to which the embodiments of the present disclosure are applied.

For example, the reception apparatus 1 may be a reception apparatus that complies with the DTMB standard for terrestrial digital broadcasts. The reception apparatus 1 is made up of an antenna 11, a tuner 12, a demodulation section 13, a decoder 14, and an output portion 15. The reception apparatus 1 also includes a controller 10 for controlling the components of the reception apparatus 1 in operation.

The antenna 11 receives an RF signal transmitted over propagation paths from a transmission apparatus 2 such as a broadcasting station. The antenna 11 feeds the received signal to the tuner 12.

The tuner 12 frequency-converts the RF signal received by the antenna 11. An IF signal obtained by performing frequency conversion on the RF signal is supplied to the demodulation section 13.

After performing A/D conversion on the signal fed from the tuner 12, the demodulation section 13 carries out predetermined demodulation processing such as a synchronization process, an equalization process, or an error correction process on the signal. The demodulation section 13 feeds coded data thus obtained to the decoder 14.

The decoder 14 subjects the coded data coming from the demodulation section 13 to MPEG decoding for example. The decoder 14 supplies video and audio data resulting from MPEG decoding to the output portion 15.

The output portion 15 is composed of a display unit, speakers and the like. The display unit displays images corresponding to the video data fed from the decoder 14. The speakers output sounds corresponding to the audio data coming from the decoder 14.

The reception apparatus 1 is structured as explained above.
[Structure of the Demodulation Portion (First Structure)]

Figure 3:
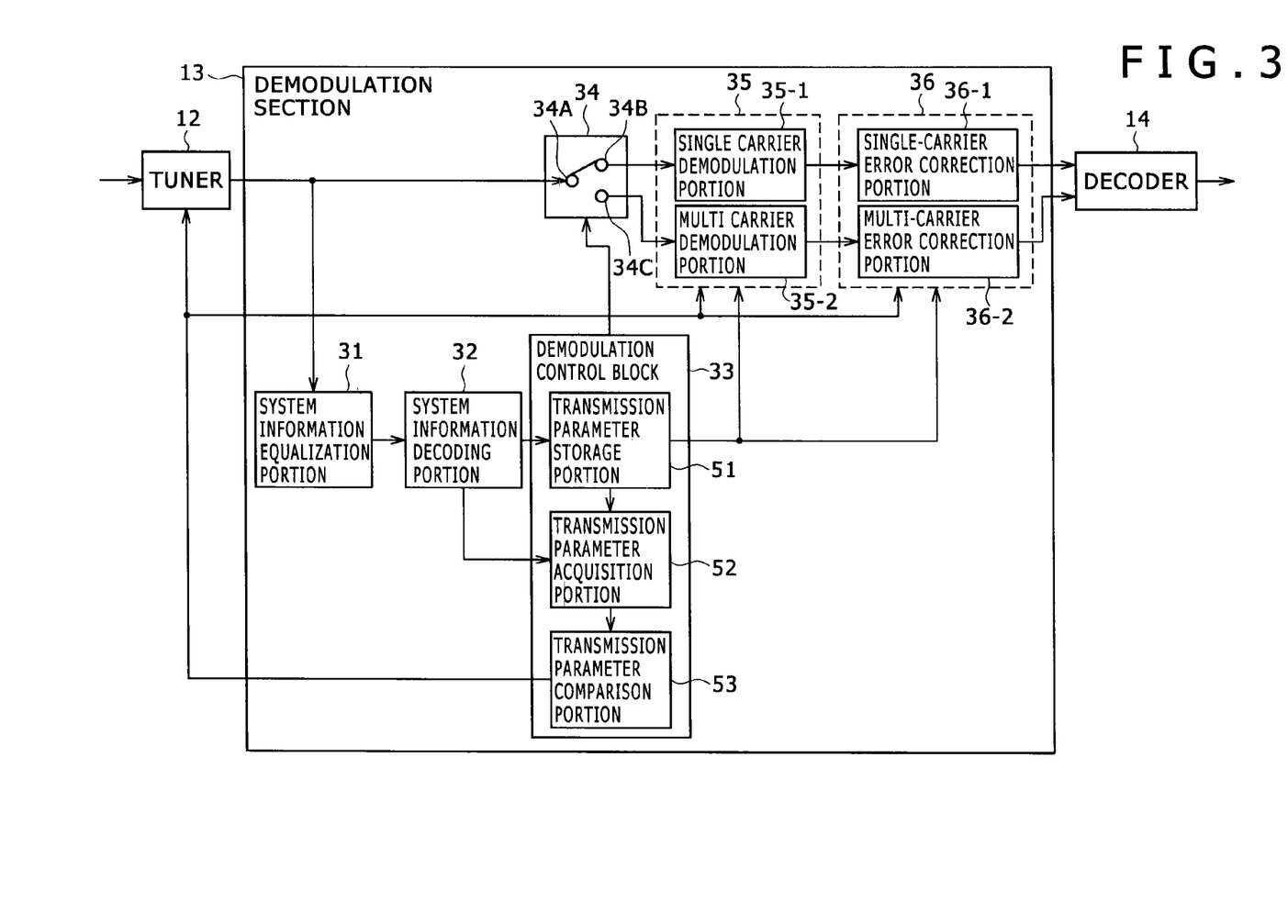
FIG. 3 is a block diagram showing a structure (first structure) of a demodulation portion.

Explained below in reference to FIG. 3 is a detailed structure of the demodulation section 13 indicated in FIG. 2.

As shown in FIG. 3, the demodulation section 13 is made up of a system information equalization portion 31, a system information decoding portion 32, a demodulation control block 33, a switching portion 34, a demodulation block 35, and an error correction portion 36.

The signal having undergone the synchronization process by the tuner 12 is supplied to the system information equalization portion 31 and switching portion 34.

The system information equalization portion 31 performs the equalization process on the signal fed from the tuner 12, and sends the signal obtained by equalization to the system information decoding portion 32.

From the signal coming from the system information equalization portion 31, the system information decoding portion 32 extracts a group of system information symbols (SI in FIG. 1) and decodes the extracted symbol group. The system information decoding portion 32 acquires transmission parameters by sequentially decoding the system information symbol group, and supplies the parameters thus obtained to the demodulation control block 33.

According to the DTMB standard, as mentioned above, the transmission parameters may be obtained typically in the form of FEC (Forward Error Correction) rates (e.g., 0.4, 0.6, 0.8), interleave lengths (e.g., 240, 720), or constellations (e.g., 4QAM, 4QAM-NR, 16QAM, 32QAM, 64QAM).

The demodulation control block 33 is made up of a transmission parameter storage portion 51, a transmission parameter acquisition portion 52, and a transmission parameter comparison portion 53.

The transmission parameters fed from the system information decoding portion 32 are sent to the transmission parameter storage portion 51 and transmission parameter acquisition portion 52.

The transmission parameter storage portion 51 stores the transmission parameters finalized to be used in the demodulation process on the received signal out of the transmission parameters decoded sequentially by the system information decoding portion 32. Also, the transmission parameter storage portion 51 feeds the transmission parameters finalized for use in the demodulation process to the demodulation block 35 and error correction portion 36.

Under control of the demodulation control block 33, the switching portion 34 switches the destinations to which to output the signal fed from the tuner 12. Under the DTMB standard, it is possible to select either a single carrier modulation system or a multi-carrier modulation system as the data modulation system. For this reason, the demodulation block 35 complying with the DTMB standard has two types of demodulators: a single carrier demodulation block 35-1 for demodulating the signal transmitted by the single carrier modulation system, and a multi-carrier demodulation block 35-2 for demodulating the signal transmitted by the multi-carrier modulation system.

Specifically, where single carrier demodulation is performed, the switching portion 34 connects a switch 34A to a terminal 34B to let the signal fed from the tuner 12 be output to the single carrier demodulation block 35-1. Where multi-carrier demodulation is carried out, the switching portion 34 connects the switch 34A to a terminal 34C to let the signal coming from the tuner 12 be output to the multi-carrier demodulation block 35-2.

The single carrier demodulation block 35-1 subjects the signal fed from the switching portion 34 to a single carrier demodulation process based on the single carrier system, and outputs the data obtained by demodulation to the single carrier error correction portion 36-1.

The multi-carrier demodulation block 35-2 subjects the signal from the switching portion 34 to a multi-carrier demodulation process based on the multi-carrier system, and outputs the data acquired by demodulation to the multi-carrier error correction portion 36-2.

Besides the equalization process, the demodulation processing carried out by the demodulation block 35 includes a slicing process and symbol deinterleaving process. The slicing process involves using constellation-related information from among the transmission parameters fed from the transmission parameter storage portion 51, while the symbol deinterleaving process involves using interleave length-related information from among the same transmission parameters.

If an OFDM system is used to perform multi-carrier transmission, what is input to the multi-carrier demodulation block 35-2 is a baseband OFDM signal obtained by a suitable processing portion (not shown) carrying out an orthogonal demodulation process on the output of the tuner 12.

The single carrier error correction portion 36-1 performs a predetermined error correction process on the data fed from the single carrier demodulation block 35-1, and sends coded data obtained from the process to the decoder 14.

The multi-carrier error correction portion 36-2 carries out a predetermined error correction process on the data supplied from the multi-carrier demodulation block 35-2, and feeds coded data acquired from the process to the decoder 14.

For example, the demodulation process performed by the error correction portion 36 may be an error correction process that uses FEC rate-related information from among the transmission parameters supplied from the transmission parameter storage portion 51.

The transmission apparatus 2 (FIG. 2) may encode video and audio data making up TV programs, for example, in MPEG (Moving Picture Experts Group) format and transmits signals composed of packets containing the MPEG-encoded data. Also, the transmission apparatus 2 may encode data in RS (Reed Solomon) code or the like to provide against errors that may occur over propagation paths. Thus in carrying out its error correction process, the error correction portion 36 may decode the encoded data and output the resulting TS (transport stream).

The transmission parameter acquisition portion 52 acquires the transmission parameters supplied sequentially from the system information decoding portion 32 and the transmission parameters (currently used in the demodulation process) held in the transmission parameter storage portion 51, and sends the acquired parameters to the transmission parameter comparison portion 53.

The transmission parameter comparison portion 53 is supplied with the transmission parameters decoded sequentially by the system information decoding portion 32 and sent from the transmission parameter acquisition portion 52, and with the transmission parameters stored in the transmission parameter storage portion 51. The transmission parameter comparison portion 53 compares the transmission parameters currently used in the demodulation process with the sequentially decoded transmission parameters.

If it is determined as a result of the comparison by the transmission parameter comparison portion 53 that there is a difference between the transmission parameters used in the demodulation process on the one hand and the sequentially decoded transmission parameters on the other hand, then the demodulation control block 33 controls the demodulation process based on transmission parameters newly decoded by the system information decoding portion 32.

That is, if the transmission parameters used in the demodulation process are different from the sequentially decoded transmission parameters, the demodulation control block 33 outputs a reset command to the tuner 12, demodulation block 35, and error correction portion 36 so as to initialize these components carrying out the steps related to the demodulation process. The demodulation control block 33 proceeds to store into the transmission parameter storage portion 51 the transmission parameters newly searched for from among the transmission parameters decoded by the system information decoding portion 32. As a result, the transmission parameters stemming from the new search are fed to the demodulation block 35 and error correction portion 36. In turn, the demodulation block 35 and error correction portion 36 again perform the demodulation process based on the transmission parameters that are newly searched for and decoded.

The demodulation section 13 shown in FIG. 3 is structured as explained above.

[First Demodulation Process]

Figure 4:
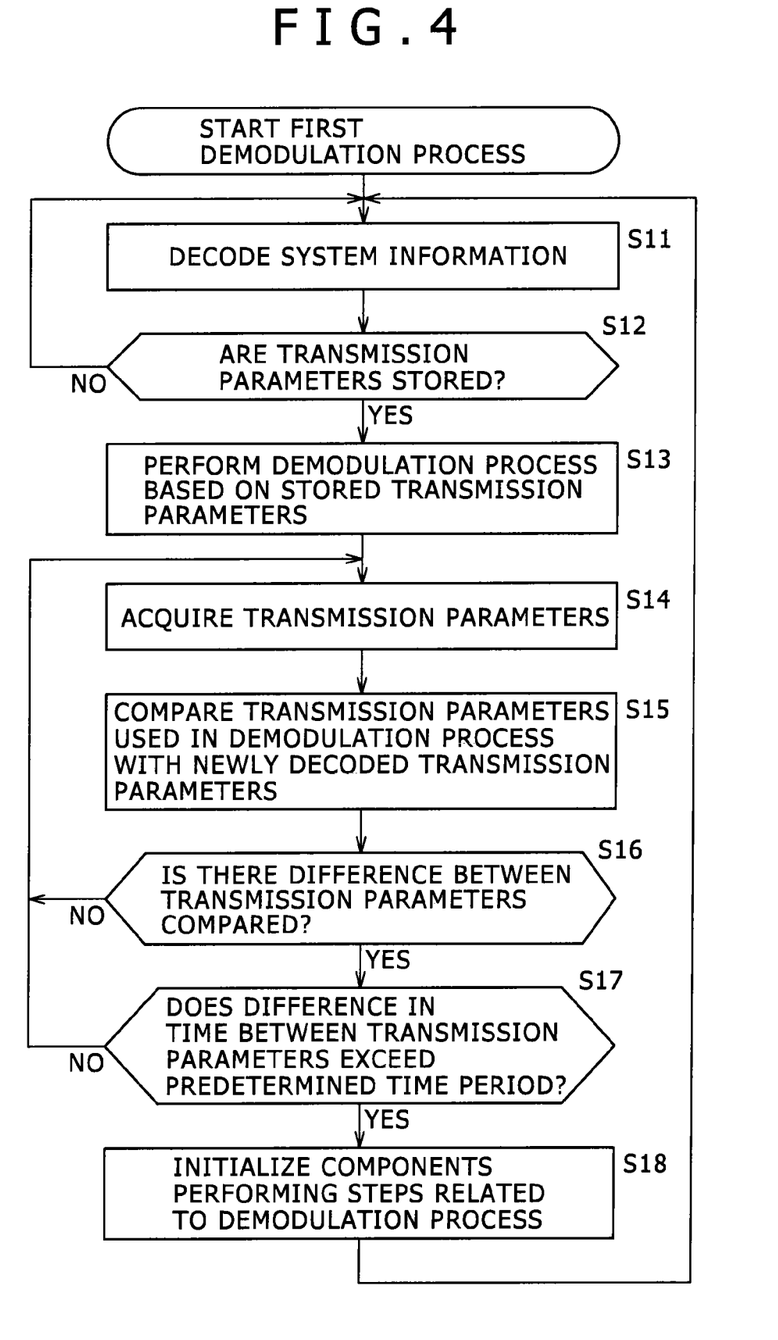
FIG. 4 is a flowchart showing a first demodulation process performed by the demodulation portion indicated in FIG. 3.

Explained below in reference to the flowchart of FIG. 4 is a first demodulation process performed by the demodulation section 13 shown in FIG. 3.

In step S11, the system information decoding portion 32 extracts a group of system information symbols from the signal having undergone the equalization process performed by the system information equalization portion 31, and decodes the extracted symbol group.

In step S12, the demodulation control block 33 determines whether the transmission parameters decoded by the system information decoding portion 32 and finalized to be used in the demodulation process are stored into the transmission parameter storage portion 51.

If in step S12 it is determined that the transmission parameters are not stored in the transmission parameter storage portion 51, step S11 is reached again. Steps S11 and S12 are then repeated until it is determined that the transmission parameters are stored ("YES" in step S12).

When the system information decoding portion 32 decodes the parameters sequentially, the transmission parameters to be used in the demodulation process are finalized. If it is determined that the transmission parameters are stored in the transmission parameter storage portion 51 ("YES" in step S12), control is passed on to step S13.

When stored into the transmission parameter storage portion 51, the transmission parameters are forwarded to the demodulation block 35 and error correction portion 36. In turn, the demodulation block 35 and error correction portion 36 carry out their demodulation processes based on the same transmission parameters as those stored in the transmission parameter storage portion 51 (in step S13).

In step S14, the transmission, parameter acquisition portion 52 acquires the transmission parameters decoded sequentially by the system information decoding portion 32 as well as the transmission parameters stored in the transmission parameter storage portion 51 and currently used in the demodulation process.

In step S15, the transmission parameter comparison portion 53 compares the transmission parameters stored in the transmission parameter storage portion 51 and currently used in the demodulation process, with the transmission parameters newly decoded by the system information decoding portion 32.

In step S16, based on the result of the comparison made by the transmission parameter comparison portion 53, the demodulation control block 33 determines whether there is a difference between the transmission parameters currently used in the demodulation process on the one hand and the newly decoded transmission parameters on the other hand.

If in step S16 it is determined that a difference is found between the transmission parameters upon comparison, step S17 is reached. In step S17, it is determined whether the difference in time between the transmission parameters being compared exceeds a predetermined time period. If a longer time period is set in advance, the difference between the transmission parameters can be detected more reliably upon comparison, but it takes more time to perform the determination process. Thus a tradeoff may have to be made between the enhanced reliability in detection and the prolonged time to perform the determination process.

If there is no difference between the compared transmission parameters ("NO" in step S16) or if the difference in time between the compared transmission parameters does not exceed a predetermined time period ("NO" in step S17), control is returned to step S14. Steps S14 through S17 are then repeated as described above. That is, while the demodulation block 35 and error correction portion 36 are performing the demodulation process, the demodulation control block 33 determines continuously whether the transmission parameters currently used in the demodulation process are different from sequentially decoded transmission parameters.

If in step S17 it is determined that the difference in time between the compared transmission parameters exceeds the predetermined time period, control is passed on to step S18. In step S18, the demodulation portion 33 outputs a reset command to the tuner 12, demodulation block 35, and error correction portion 36 so as to initialize these components carrying out the steps related to the demodulation process.

Control is then returned to step S11 and the subsequent steps are repeated. The transmission parameters newly searched for and decoded through the repeated steps are stored into the transmission parameter storage portion 51 ("YES" in step S12). The demodulation process is carried out based on the stored transmission parameters. That is, of the tuner 12, demodulation block 35 and error correction portion 36 reset in response to the reset command, the demodulation block 35 and error correction portion 36 again perform the demodulation process based on the transmission parameters newly searched for.

Thereafter, the demodulation control block 33 determines likewise whether the transmission parameters newly searched for and used in the demodulation process are different from the sequentially decoded transmission parameters (in steps S16 and S17). If it is determined that there is a difference between the compared transmission parameters for the predetermined time period ("YES" in step S17), the demodulation block 35 and other components performing the steps related to the demodulation process are initialized (in step S18). Another search is then made for the transmission parameters (in steps S11 and S12), and the demodulation process is carried out again (in step S13).

As explained above, the first embodiment continuously monitors the result of the comparison between the transmission parameters decoded and stored at the beginning of signal reception on the one hand, and sequentially decoded transmission parameters on the other hand, in order to detect changes in the transmission parameters included in the received signal. Upon detection of a change in the transmission parameters, the first embodiment again performs the demodulation process based on the transmission pdLdmeters that are newly searched for.

In the manner described above, even if changed transmission parameters included in the currently transmitted signal have caused the demodulation process to fail halfway, the first embodiment can initialize the components performing the steps related to the demodulation process and repeat the demodulation process from the beginning using the transmission parameters obtained from the new search. This makes it possible to perform the demodulation process reliably, which in turn eliminates the need for the viewer to again search for the desired channel following a demodulation failure and thereby alleviates operating burdens on the viewer.

<2. Second Embodiment>
[Structure of the Demodulation Process (Second Structure)]

Figure 5:
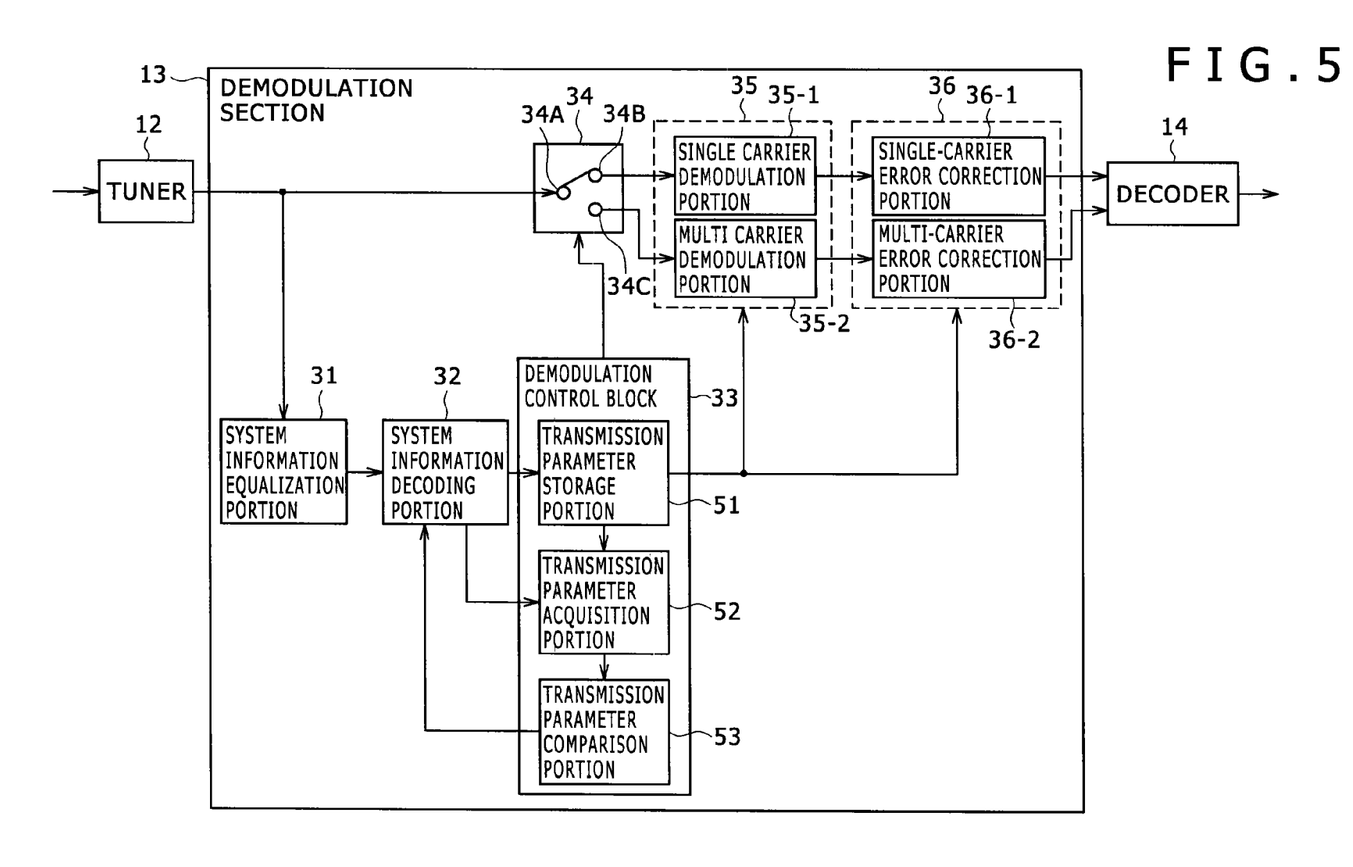
FIG. 5 is a block diagram showing a structure (second structure) of the demodulation portion.

Explained below in reference to FIG. 5 is another structure of the demodulation section 13 shown in FIG. 2.

In FIG. 5 showing the demodulation section 13, like reference characters designate like or corresponding components of the above-described demodulation section 13 in FIG. 3, so that their explanations will be omitted where appropriate.

In FIG. 5, if a comparison made by the transmission parameter comparison portion 53 reveals a difference between the transmission parameters currently used in the demodulation process on the one hand and sequentially decoded transmission parameters on the other hand, the demodulation control block 33 controls the demodulation process based on transmission parameters newly decoded by the system information decoding portion 32.

That is, if the transmission parameters currently used in the demodulation process are different from the sequentially decoded transmission parameters, the demodulation control block 33 instructs the system information decoding portion 32 to feed newly decoded transmission parameters to the transmission parameter storage portion 51. Under instructions from the demodulation control block 33, the system information decoding portion 32 supplies the newly decoded transmission parameters to the transmission parameter storage portion 51. In turn, the transmission parameter storage portion 51 replaces the transmission parameters currently used in the demodulation process on the received signal with the newly decoded transmission parameters that are different from the currently used transmission parameters.

The transmission parameters newly decoded and stored into the transmission parameter storage portion 51 are forwarded to the demodulation block 35 and error correction portion 36. The demodulation block 35 and error correction portion 36 carry out the demodulation process based on the newly decoded transmission parameters.

The demodulation section 13 shown in FIG. 5 is structured as explained above.

[Second Demodulation Process]

Figure 6:
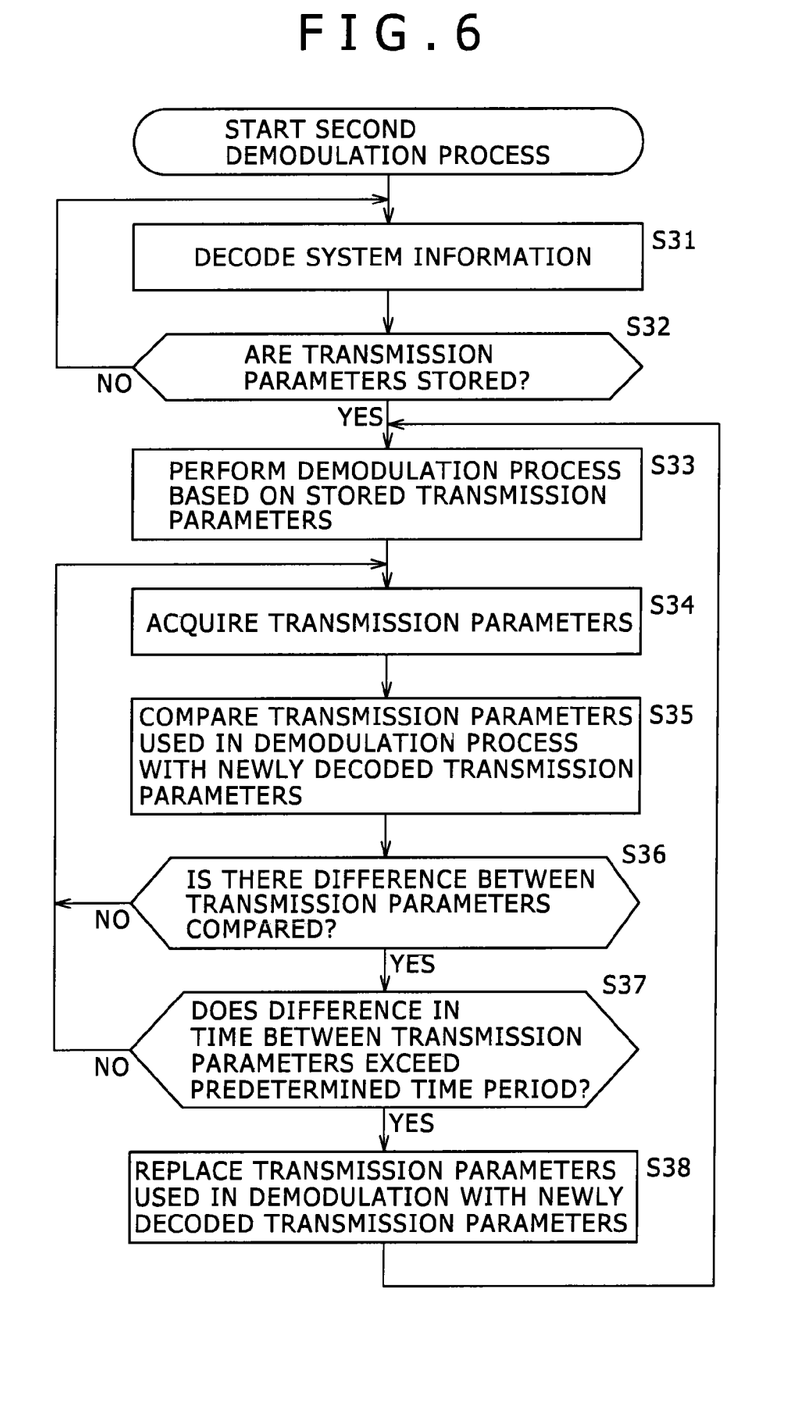
FIG. 6 is a flowchart showing a second demodulation process performed by the demodulation portion indicated in FIG. 5.

Explained below in reference to the flowchart of FIG. 6 is a second demodulation process carried out by the demodulation section 13 shown in FIG. 5.

In steps S31 through S37, as in steps S11 through S17 of FIG. 4, the result of the comparison between the transmission parameters decoded and stored at the beginning of signal reception on the one hand and sequentially decoded transmission parameters on the other hand is continuously monitored. If there is a change in the transmission parameters included in the received signal ("YES" in steps S36 and S37), control is passed on to step S38.

In step S38, the demodulation control block 33 controls the system information decoding portion 32 to replace the transmission parameters stored in the transmission parameter storage portion 51 and currently used in the demodulation process with newly decoded transmission parameters that are different from the currently used transmission parameters.

Control is then returned to step S33. In step S33, the demodulation block 35 and error correction portion 36 perform the demodulation process based on the newly decoded transmission parameters. Thereafter, the demodulation control block 33 likewise determines whether there is a difference between the transmission parameters currently used in the demodulation process on the one hand and the sequentially decoded transmission parameters on the other hand upon comparison (in steps S36 and S37). If it is determined that there is a difference between the compared transmission parameters for the predetermined time period ("YES" in step S37), the transmission parameters currently used in the demodulation process are again replaced with the newly decoded transmission parameters (in step S38). The demodulation process is then performed on the basis of the changed transmission parameters (in step S33).

As explained above, the second embodiment continuously monitors the result of the comparison between the transmission parameters decoded and stored at the beginning of signal reception on the one hand and sequentially decoded transmission parameters on the other hand, in order to detect changes in the transmission parameters included in the received signal. Upon detection of a change in the transmission parameters, the transmission parameters currently used in the demodulation process are replaced with newly decoded transmission parameters. The demodulation process is then carried out based on the newly decoded transmission parameters.

In the manner described above, even if changed transmission parameters included in the currently transmitted signal have caused the demodulation process to fail halfway, the second embodiment can replace the transmission parameters currently used in the demodulation process with newly decoded transmission parameters so as to restore the normal demodulation process. This arrangement ensures reliable demodulation processing. That is, whereas it is usually difficult to repeat the failed demodulation process, the second embodiment can monitor only the transmission parameters and, upon detection of a change in the transmission parameters, can restore the normal demodulation process by simply replacing the currently used transmission parameters with the newly decoded parameters. This makes it possible rapidly to put the demodulation process back to normal.

With ordinary reception apparatuses, changing transmission parameters included in the received signal can ruin the processes of equalization and error correction. This usually makes it necessary to install a processing portion for performing resynchronization because of MPEG decoding being unavailable. With the second embodiment of the present disclosure, however, normal viewing can be restored rapidly by decoding and monitoring only transmission parameters without demodulating all received signals within each frame. The embodiment of the disclosure can thus implement significantly quicker recovery from disrupted viewing than before, for example.

<3. Variations>

With regard to the above-described embodiments, the present disclosure was shown applied to the reception apparatuses complying with the DTMB standard for terrestrial digital broadcasts. Alternatively, the present disclosure may be applied to reception apparatuses complying with other terrestrial digital broadcast standards involving the use of transmission parameters.

Regarding the above-described embodiments, the demodulation section 13 was shown to be a processing portion constituting part of the reception apparatus 1. Alternatively, the demodulation section 13 may be considered a single demodulation apparatus (demodulation LSI). Also regarding the above embodiments, the demodulation control block 33 controlling the demodulation process was shown included in the demodulation section 13. Alternatively, the demodulation control block 33 may be included in the controller 10, so that the demodulation process of the demodulation section 13 may be controlled by the controller 10. As another alternative, the error correction portion 36 may be furnished not as part of the demodulation section 13 but as an independent-processing portion downstream of the demodulation section 13. As a further alternative, the demodulation section 13 may be provided with an A/D conversion portion (not shown).

With regard to the above-described embodiments, the synchronization process was shown carried out by the demodulation section 13. Alternatively, the synchronization process may be performed by the tuner 12 located upstream of the demodulation section 13. In this case, the demodulation section 13 performs A/D conversion on the signal having undergone the synchronization process, before carrying out other processes such as equalization on the converted signal.

Regarding the first embodiment described above, the components performing the steps related to the demodulation process were shown initialized before transmission parameters are again searched for. Alternatively, the transmission parameters used upon determination of the difference therebetween (i.e., transmission parameters decoded by the system information decoding portion 32) may be used unmodified as the transmission parameters for use in the demodulation process to be performed again. In this case, the sending of relevant transmission parameters to the components involved may be accomplished, for example, by the demodulation control block 33 supplying the demodulation block 35 and error correction portion 36 with the transmission parameters acquired by the transmission parameter acquisition portion 52, or with a reset command supplemented with the transmission parameters.

Regarding the second embodiment explained above, monitoring was shown to be made of the transmission parameters and, upon detection a change in the transmission parameters, the transmission parameters were shown replaced. Alternatively, when the changed transmission parameters are detected, the demodulation block 35, error correction portion 36 and other components performing the steps related to the demodulation process may be initialized.

[Explanation of the Computer to Which the Present Disclosure is Applied]

The series of the processes described above may be executed either by hardware or by software. Where the software-based processing is to be carried out, the programs constituting the software may be either incorporated beforehand in the dedicated hardware of the computer to be used or installed upon use from a suitable program recording medium into a general-purpose personal computer or like equipment capable of executing diverse functions based on the installed programs.

Figure 7:
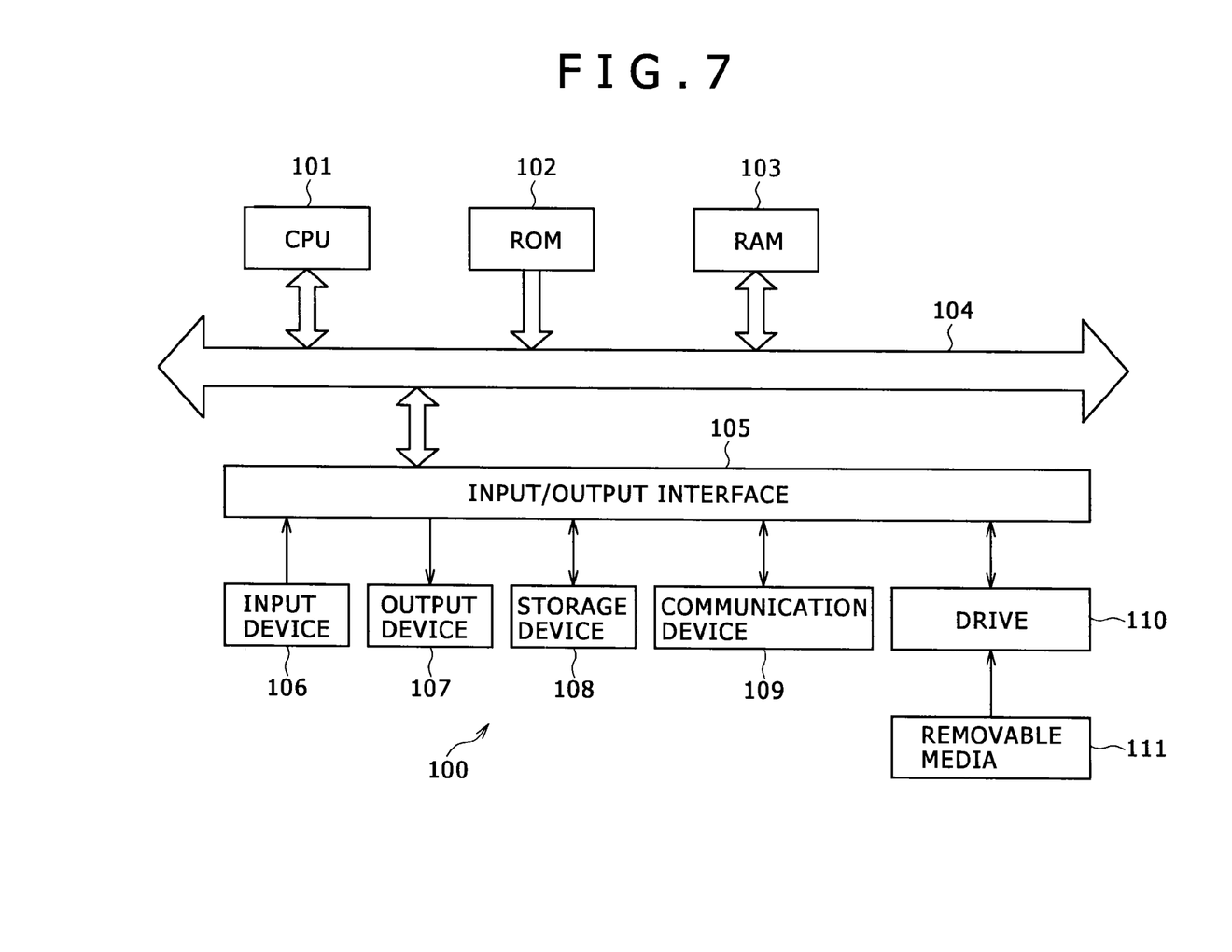
FIG. 7 is a schematic view showing a typical hardware structure of a computer.

FIG. 7 is a schematic view showing a typical structure of a computer 100 that executes the series of the processes discussed above using programs.

In the computer 100, a CPU (central processing unit) 101, a ROM (read only memory) 102, and a RAM (random access memory) 103 are interconnected via a bus 104.

An input/output interface 105 is also connected to the bus 104. The input/output interface 105 is connected with an input device 106 typically made up of a keyboard, a mouse and a microphone; an output device 107 usually composed of a display unit and speakers; a storage device 108 generally formed by a hard disk and/or a nonvolatile memory; a communication device 109 constituted by a network interface or the like; and a drive 110 that drives a piece of removable media 111 such as magnetic disks, optical disks, magneto-optical disks, and semiconductor memories.

In the computer 100 structured as outlined above, the CPU 101 performs the series of the above-described processes by loading the programs held in the storage device 108 into the RAM 103 for program execution by way of the input/output interface 105 and bus 104.

In this specification, the steps describing the programs to be executed by the computer represent not only the processes that are to be carried out in the depicted sequence (i.e., on a time series basis) but also processes that may be performed parallelly or individually and not necessarily chronologically.

It should be understood by those skilled in the art that various modifications, combinations, sub-combinations and alterations may occur depending on design requirements and other factors in so far as they are within the scope of the appended claims or the equivalents thereof.

The present disclosure contains subject matter related to that disclosed in Japanese Priority Patent Application JP 2010-240782 filed in the Japan Patent Office on Oct. 27, 2010, the entire content of which is hereby incorporated by reference.

What is claimed is:

1. A reception apparatus comprising:
a reception section configured to receive a signal modulated by a predetermined system defined by a predetermined standard;
a decoding section configured to decode transmission parameters included in the received signal;
an acquisition section configured to acquire from among sequentially decoded transmission parameters the parameters used in a demodulation process performed on said received signal; and
a control section configured such that if the acquired transmission parameters used in the demodulation process on said received signal are different from the sequentially decoded transmission parameters, then said control section controls the demodulation process on said received signal based on newly decoded transmission parameters.

2. The reception apparatus according to claim 1, wherein, if the difference exists between the transmission parameters, said control section initializes components for executing steps related to the demodulation process on said received signal, before causing said components to again execute the demodulation process based on the newly decoded transmission parameters resulting from a new search.

3. The reception apparatus according to claim 2, wherein, if the difference in time between the acquired transmission parameters used in the demodulation process on said received signal on the one hand and said sequentially decoded transmission parameters on the other hand exceeds a predetermined time period, then said control section starts initializing said components for executing the demodulation process on said received signal.

4. The reception apparatus according to claim 1, wherein, if the difference exists between the transmission parameters, said control section replaces the transmission parameters used in the demodulation process on said received signal with the newly decoded transmission parameters different from the currently used transmission parameters.

5. The reception apparatus according to claim 4, wherein, if the difference in time between the acquired transmission parameters used in the demodulation process on said received signal on the one hand and said sequentially decoded transmission parameters on the other hand exceeds a predetermined time period, then said control section changes the currently used transmission parameters.

6. The reception apparatus according to claim 1, wherein said transmission parameters constitute information about Forward Error Correction rates, interleave lengths, or constellations.

7. A reception method for use with a reception apparatus, said reception method comprising:
causing said reception apparatus to receive a signal modulated by a predetermined system defined by a predetermined standard;
causing said reception apparatus to decode transmission parameters included in the received signal;
causing said reception apparatus to acquire from among sequentially decoded transmission parameters the parameters used in a demodulation process performed on said received signal; and
if the acquired transmission parameters used in the demodulation process on said received signal are different from the sequentially decoded transmission parameters, then causing said reception apparatus to control the demodulation process on said received signal based on newly decoded transmission parameters.

8. A non-transitory computer readable medium having stored thereon a program for use with a computer, wherein said program, when executed by the computer, controls the computer as follows:
causing said computer to function as a reception section receiving a signal modulated by a predetermined system defined by a predetermined standard;
causing said computer to function as a decoding section decoding transmission parameters included in the received signal;
causing said computer to function as an acquisition section acquiring from among sequentially decoded transmission parameters the parameters used in a demodulation process performed on said received signal; and
if the acquired transmission parameters used in the demodulation process on said received signal are different from the sequentially decoded transmission parameters, then causing said computer to function as a control section controlling the demodulation process on said received signal based on newly decoded transmission parameters.

9. A demodulation apparatus comprising:
a decoding section configured to decode transmission parameters included in a received signal modulated by a predetermined system defined by a predetermined standard;
an acquisition section configured to acquire from among sequentially decoded transmission parameters the parameters used in a demodulation process performed on said received signal; and
a control section configured such that if the acquired transmission parameters used in the demodulation process on said received signal are different from the sequentially decoded transmission parameters, then said control section controls the demodulation process on said received signal based on newly decoded transmission parameters.

10. The demodulation apparatus according to claim 9, wherein, if the difference exists between the transmission parameters, said control section initializes components for executing steps related to the demodulation process on said received signal, before causing said components to again execute the demodulation process based on the newly decoded transmission parameters resulting from a new search.

11. The demodulation apparatus according to claim 10, wherein, if the difference in time between the acquired transmission parameters used in the demodulation process on said received signal on the one hand and said sequentially decoded transmission parameters on the other hand exceeds a predetermined time period, then said control section starts initializing said components for executing the demodulation process on said received signal.

12. The demodulation apparatus according to claim 9, wherein, if the difference exists between the transmission parameters, said control section replaces the transmission parameters used in the demodulation process on said received signal with the newly decoded transmission parameters different from the currently used transmission parameters.

13. The demodulation apparatus according to claim 12, wherein, if the difference in time between the acquired transmission parameters used in the demodulation process on said received signal on the one hand and said sequentially decoded transmission parameters on the other hand exceeds a predetermined time period, then said control section changes the currently used transmission parameters.

14. The demodulation apparatus according to claim 9, wherein said transmission parameters constitute information about Forward Error Correction rates, interleave lengths, or constellations.

15. A demodulation method for use with a demodulation apparatus, said demodulation method comprising:
 causing said demodulation apparatus to decode transmission parameters included in a received signal modulated by a predetermined system defined by a predetermined standard;
 causing said demodulation apparatus to acquire from among sequentially decoded transmission parameters the parameters used in a demodulation process performed on said received signal; and
 if the acquired transmission parameters used in the demodulation process on said received signal are different from the sequentially decoded transmission parameters, then causing said demodulation apparatus to control the demodulation process on said received signal based on newly decoded transmission parameters.

16. A non-transitory computer readable medium having stored thereon a program for use with a computer, wherein said program, when executed by the computer, controls the computer as follows:
 causing said computer to function as a decoding section decoding transmission parameters included in a received signal modulated by a predetermined system defined by a predetermined standard;
 causing said computer to function as an acquisition section acquiring from among sequentially decoded transmission parameters the parameters used in a demodulation process performed on said received signal; and
 if the acquired transmission parameters used in the demodulation process on said received signal are different from the sequentially decoded transmission parameters, then causing said computer to function as a control section controlling the demodulation process on said received signal based on newly decoded transmission parameters.

* * * * *